United States Patent
Stoebe et al.

(10) Patent No.: US 6,747,847 B2
(45) Date of Patent: Jun. 8, 2004

(54) SELF-FLUSHING TRENCH AIR BEARING FOR IMPROVED SLIDER FLYABILITY

(75) Inventors: Timothy W. Stoebe, Minnetonka, MN (US); Anthony P. Sannino, Longmont, CO (US); Jorge V. Hanchi, St. Louis Park, MN (US); Scott E. Ryun, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 261 days.

(21) Appl. No.: 10/043,078

(22) Filed: Jan. 9, 2002

(65) Prior Publication Data

US 2002/0089790 A1 Jul. 11, 2002

Related U.S. Application Data

(60) Provisional application No. 60/260,782, filed on Jan. 10, 2001.

(51) Int. Cl.[7] ................................................. G11B 5/60
(52) U.S. Cl. .............................. 360/235.8; 360/235.7; 360/236.3
(58) Field of Search .......................... 360/236.3, 235.7, 360/235.8

(56) References Cited

U.S. PATENT DOCUMENTS

| | | | |
|---|---|---|---|
| 4,212,044 A | 7/1980 | Plotto | 360/103 |
| 4,486,798 A | 12/1984 | Feliss et al. | 360/103 |
| 4,510,541 A | 4/1985 | Sasamoto | 360/97 |
| 5,467,238 A | 11/1995 | Lee et al. | 360/128 |
| 5,751,517 A | 5/1998 | Agarwal | 360/103 |
| 6,233,118 B1 | 5/2001 | Boutaghou et al. | 360/235.4 |
| 6,462,909 B1 * | 10/2002 | Boutaghou et al. | 360/235.8 |
| 6,515,831 B1 * | 2/2003 | Sannino et al. | 360/235.6 |

\* cited by examiner

Primary Examiner—Robert S. Tupper
(74) Attorney, Agent, or Firm—Kinney & Lange, P.A.

(57) ABSTRACT

A slider is used for supporting a transducing head proximate a rotating disc. The slider includes a slider body having a disc opposing face bounded by a leading edge, a trailing edge, and first and second side edges. The slider body has a longitudinal axis. An air bearing surface is defined on the disc opposing face and the air bearing surface has a pad proximate the trailing edge. A trench is positioned adjacent to the pad with the trench being recessed from the air bearing surface at a step depth. A channel for flushing lubricant from the disc opposing face is positioned on the pad. The channel is recessed from the air bearing surface at a channel depth.

18 Claims, 5 Drawing Sheets

SELF-FLUSHING TRENCH AIR BEARING FOR IMPROVED SLIDER FLYABILITY

CROSS-REFERENCE TO RELATED APPLICATION(S)

This application claims priority from Provisional Application No. 60/260,782, filed Jan. 10, 2001, for "SELF-FLUSHING TRENCH AIR BEARING FOR IMPROVED SLIDER FLYABILITY" by Timothy W. Stoebe, Anthony P. Sannino, Jorge V. Hanchi, and Scott E. Ryun.

BACKGROUND OF THE INVENTION

The present invention relates to an air bearing slider carrying a transducing head in a disc drive. More particularly, it relates to flushing lubricant from the slider that has accumulated on the slider.

Air bearing sliders have been extensively used in disc drives to appropriately position a transducing head above a rotating disc. In many high capacity storage applications, when the disc is at rest, the air bearing slider is in contact with the disc. During operation, the disc rotates at high speeds, which generates a relative flow of air immediately adjacent the flat surface of the disc. The relative flow of air acts upon the lower air bearing surface of the slider and generates a pressurization profile that causes the slider to fly at an ultra-low fly height above the disc. A slider is typically mounted on a suspension comprising a gimbal and load beam assembly which biases the slider toward the rotating disc, providing a preload force opposite to the lift force acting on the air bearing surface of the slider. In negative pressure sliders, the relative flow of air also acts upon a portion of the air bearing surface of the slider to generate a suction force. The suction force counteracts the lift force by pulling the slider back toward the surface of the disc. For the slider to maintain a stable flying height above the surface of the disc, the lift force must be balanced with the preload and suction forces.

As disc storage systems are designed for increased storage capacities, the density of concentric data tracks on the disc increases (that is, the size of data tracks and radial spacing between data tracks decreases). Reduced fly height is one aspect of achieving higher data storage densities. Furthermore, increased data storage density requirements has resulted in a decrease in the air bearing gap, or head media spacing (HMS) between the transducing head carried by the slider and the rotating disc. As HMS has decreased and data storage densities have increased, accumulation of lubricant (lube) on the slider has become an increasing problem and frequent cause of eventual interface failure and slider crashing upon extended device operation.

Lubricant is typically applied to the disc to prevent corrosion. Additionally, lubricant aids in protecting the slider, the transducing head, and the disc from being damaged during intermittent contact between the slider and the disc. Lubricant displaced from the disc by evaporation or head disc contact may collect on the slider body. The collected lube typically migrates across the surface of the slider and accumulates in a location where airflow across the slider tends to produce a stagnation point. Trenches or other features maybe included in the slider to generate lift force or alter the pressurization profile. Such features may create regions of air flow stagnation and are a common location for lubricant accumulation. Lubricant accumulation in the trenches changes the contours of the slider and may induce a loss of fly height. A loss of fly height leaves the slider more susceptible to media-topography induced fly modulation and may result in increased intermittent contact between the slider and the disc. This process results in further lubricant accumulation and additional fly height loss. Cumulative fly height loss results until eventually the slider crashes.

The progressive accumulation of lubricant within the trenches induces a loss of fly height and increased modulation resulting in interface failure and slider crashing into the media. There is a need in the art for a slider with features that prevent progressive lubricant accumulation and thereby preserve the flyability of the slider.

BRIEF SUMMARY OF THE INVENTION

The present invention relates to a slider for supporting a transducing head proximate a rotating disc. The slider includes a slider body having a disc opposing face bounded by a leading edge, a trailing edge, and first and second side edges. The slider body has a longitudinal axis. An air bearing surface is defined on the disc opposing face and the air bearing surface has a pad proximate the trailing edge. A trench is positioned adjacent to the pad with the trench being recessed from the air bearing surface at a step depth. A channel for flushing lubricant from the disc opposing face is positioned on the pad. The channel is recessed from the air bearing surface at a channel depth.

In one preferred embodiment of the present invention, the channel is comprised of a first channel and a second channel positioned on the pad wherein the first channel extends relative to the longitudinal axis at a positive angle and the second channel extends relative to the longitudinal axis at a negative angle.

In another preferred embodiment of the present invention, the pad is a center pad, and first and second side rails are positioned substantially along the first and second side edges of the slider body. The slider also includes a left side pad and a right side pad located at ends of the first and second side rails adjacent the trailing edge. A left side channel is positioned on the left side pad and a right side channel is positioned on the right side pad.

DETAILED DESCRIPTION

Figure 1:
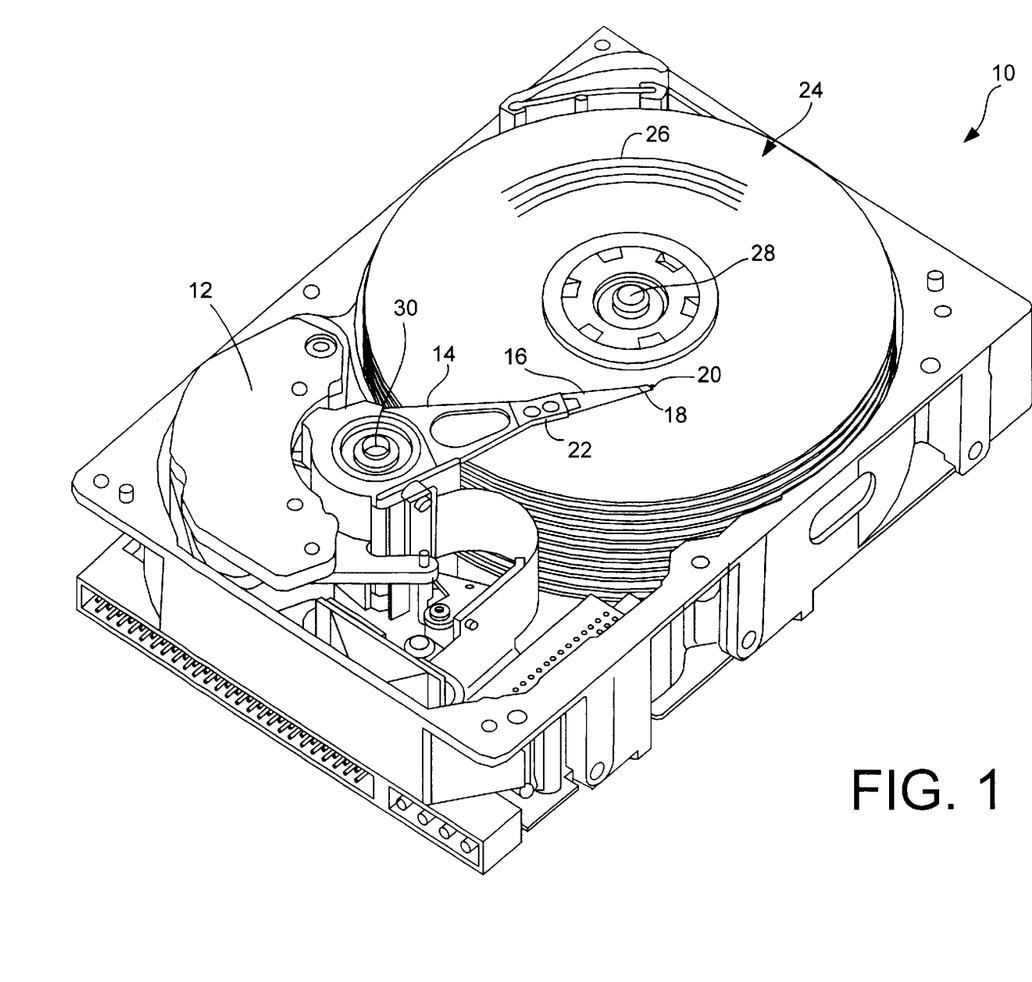
FIG. 1 shows a top perspective view of a disc drive actuation system for positioning a slider over tracks of a disc.

FIG. 1 shows a top perspective view of a disc drive actuation system 10 for positioning a transducing head (shown in FIG. 2) over a track of a disc as known in the prior art. The actuation system 10 includes a voice coil motor (VCM) 12, an actuator arm 14, a suspension 16, a flexure 18, and a slider 20. Slider 20 is connected to the distal end of the suspension 16 by the flexure 18. Suspension 16 is connected to actuator arm 14 at a head mounting block 22, while actuator arm 14 is coupled to VCM 12. As shown on the right side of FIG. 1, the disc drive assembly includes a disc 24, having a multiplicity of tracks 26, which rotates about an axis 28. During operation of the disc drive assembly, rotation of disc 24 generates air movement which is encountered by slider 20. This air movement acts to keep slider 20 aloft a small distance above the surface of disc 24 allowing the slider to fly above the surface of disc 24. VCM 12 is selectively operated to move actuator arm 14 around an axis 30 thereby moving suspension 16 and positioning the transducing head (not shown) carried by slider 20 between tracks 26 of disc 24. Proper positioning of the transducing head is necessary for reading and writing data on the concentric tracks 26 of disc 24.

Figure 2:
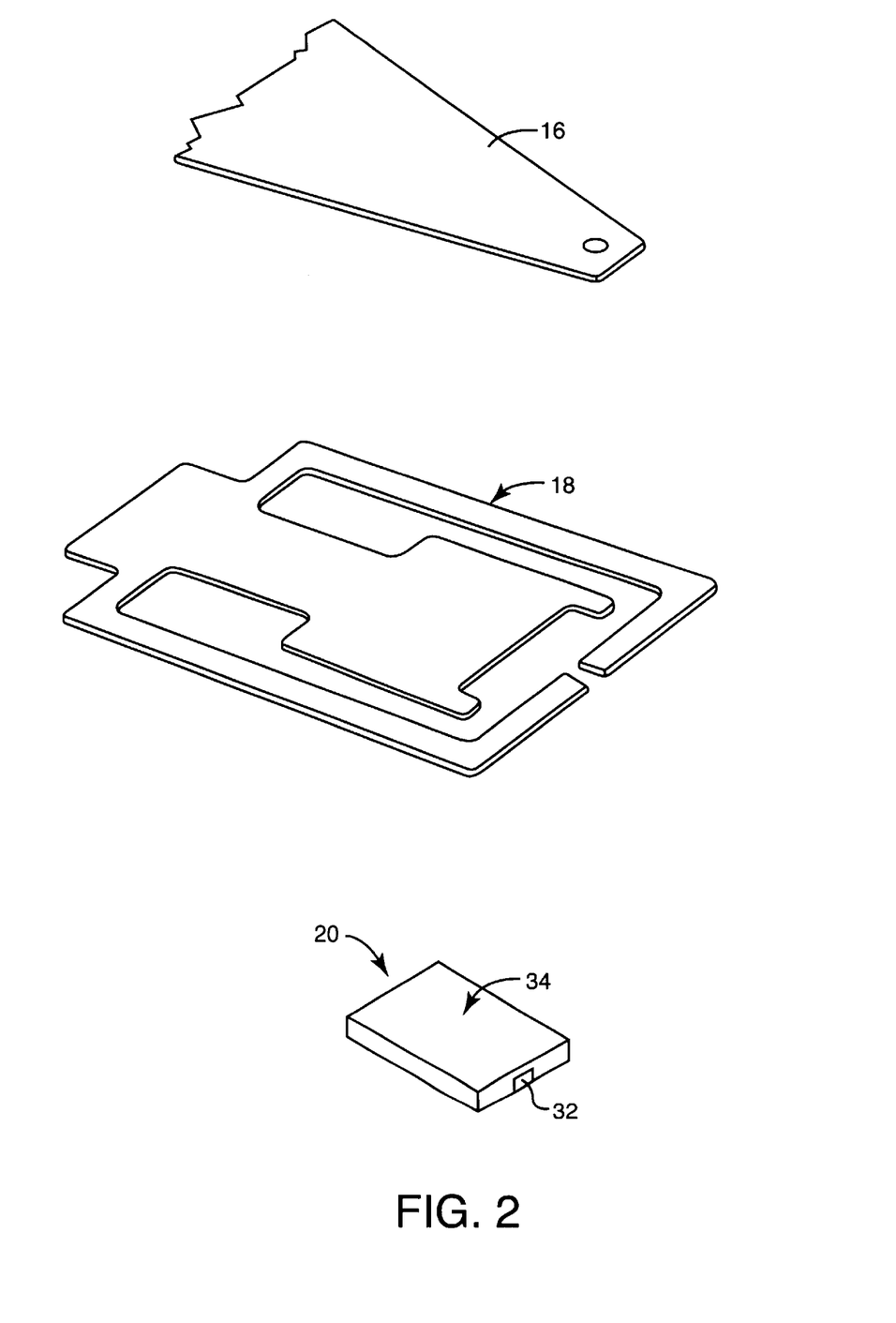
FIG. 2 shows an exploded perspective view of the distal portion of the disc drive actuation system of FIG. 1.

FIG. 2 is an exploded perspective view of the distal portion of the disc drive actuation system 10 (shown in FIG. 1) as known in the prior art. Shown in FIG. 2, from top to bottom, is suspension 16, flexure 18, and slider 20 carrying a transducing head 32. Flexure 18 is attached to suspension 16 and slider 20 attaches to a bottom surface of flexure 18. Transducing head 32 is carried by slider 20. Flexure 18 provides a spring connection between slider 20 and suspension 16. Air bearing slider 20 includes a disc opposing face (not shown) and a flexure opposing face 34. Flexure opposing face 34 is attached to the bottom surface of flexure 18. Flexure 18 is configured such that it allows slider 20 to move in pitch and roll directions. Many different types of flexures 18, also known as gimbals, are known to provide the spring connection allowing for pitch and roll movement of slider 20 and can be used with the present invention. Transducing head 32 is carried by slider 20 to write and read data to and from disc 24. In operation, suspension 16 and flexure 18 carrying slider 20 are all moved together as coarse positioning is performed by VCM 12 (FIG. 1) to move actuator arm 14 (FIG. 1).

Figure 3:
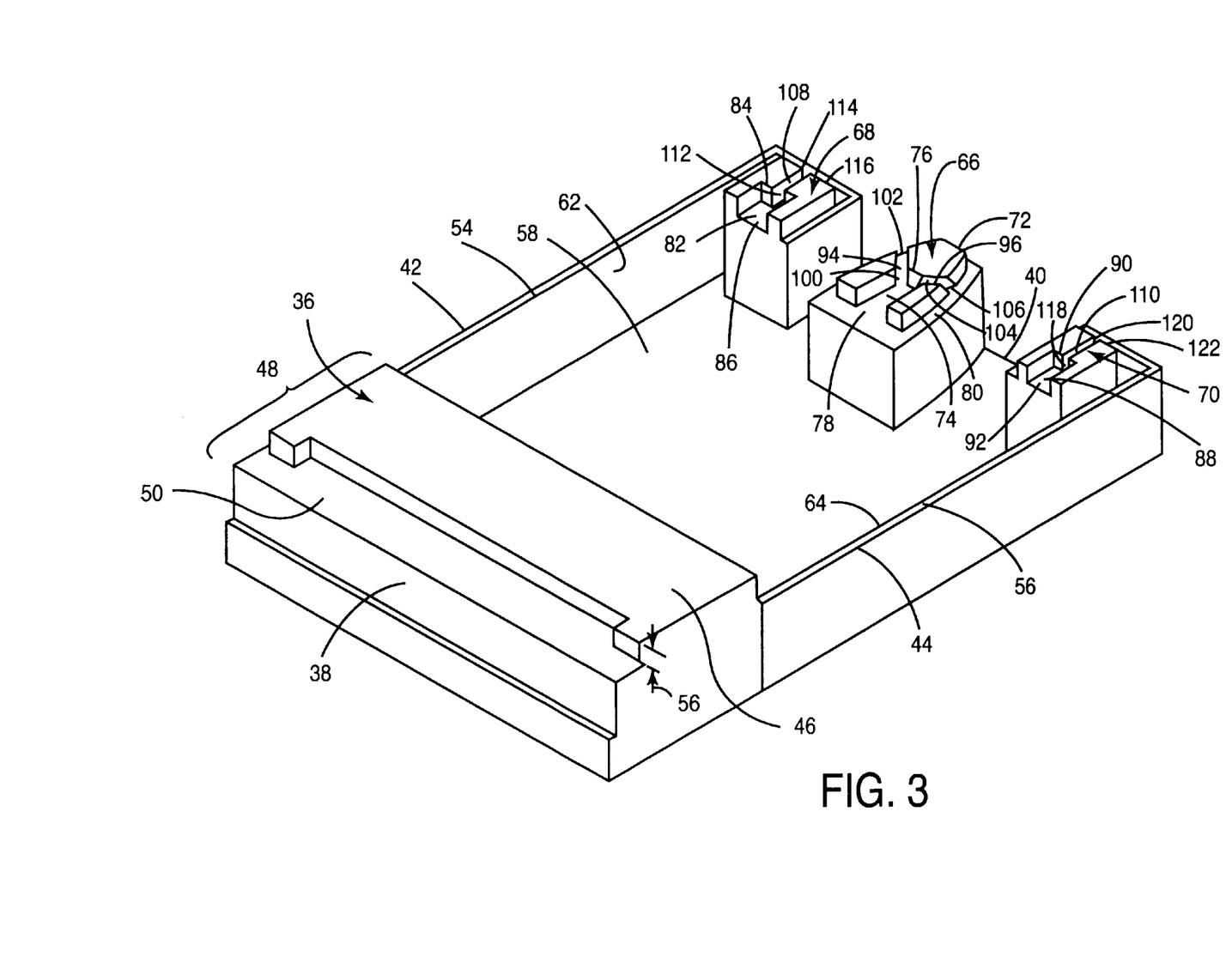
FIG. 3 shows a bottom perspective view of a slider.

FIG. 3 is a bottom perspective view of slider 20 which prevents lubricant from accumulating on disc opposing face 36 of the slider. Slider 20, or the slider body, has a disc opposing face 36 bounded by a leading edge 38, a trailing edge 40, a first side edge 42, and a second side edge 44. Leading edge 38 and trailing edge 40 are substantially parallel to each other, and two side edges 42 and 44 are substantially parallel to each other. Other configurations are possible for the slider body, including trapezoidal shapes. During operation, disc opposing face 36 is directed toward disc 24 (FIG. 1).

The contour of disc opposing face 36 of air bearing slider 20 has a significant effect on the flying characteristics of air bearing slider 20, and various contours have been proposed and used for air bearing sliders. Samples of two of these are included in U.S. Pat. No. 5,062,017 by Strong et al. and U.S. Pat. No. 5,343,343 by Chapin both of which are assigned to Seagate Technology, Inc. and are hereby incorporated by reference. The slider must maintain adequate roll pitch and normal stiffness over the predetermined concentric data track, corresponding to a range of operating speeds, and over a predetermined range of skew angles. While the disc drive is in operation, to accommodate disc storage systems designed for greater storage capacity, the density of concentric data tracks on the disc increases (that is the size of the data track and the radial spacing between the data tracks decreases). One result of achieving higher data storage densities in the disc is the need to operate the air bearing slider at an ultra-low fly height over the disc. The increase in data storage density requires that the head media spacing (HMS), or the air bearing gap, between the transducing head carried by the slider and the rotating disc be reduced.

Disc opposing face 36 of slider 20 defines an air bearing surface 46. Air bearing surface 46 is the reference level for slider 20. A cross rail 48 is positioned behind leading edge 38 and extends from first side edge 42 to second side edge 44. Cross rail 48 typically has a height equal to air bearing surface 46, however, a front portion 50 of cross rail 48 is recessed from air bearing surface 46. Front portion 50 is preferably recessed from air bearing surface 46 at a step depth 52.

A first side rail 54 is positioned adjacent first side edge 42 and a second side rail 56 is positioned adjacent second side edge 44. Side rails 54 and 56 extend from cross rail 48 towards trailing edge 40. First side rail 54 and second side rail 56 are disposed substantially parallel to each other. Side rails 54 and 56 are preferably recessed from air bearing surface 46 at step depth 52. Step depth 52 is preferably between about 0.2 microns and about 0.3 microns. Other embodiments of slider 20 may have side walls at a height equal to air bearing surface 46 or side walls of substantially different heights.

A cavity 58 is positioned on disc opposing face 36. Cavity 58 is recessed from air bearing surface 46 at a cavity depth (shown in FIG. 5). The cavity depth is preferably between about 1.5 microns and about 3.0 microns. First side rail 54 has an inner face 62 facing cavity 58 and second side rail 56 has an inner face 64 facing cavity 58. Cavity 58 is bounded by cross rail 48, inner face 62 of first side rail 54, and inner face 64 of second side rail 56.

A center pad 66, a first side pad 68 and a second side pad 70 are positioned proximate to trailing edge 40. Each pad 66, 68 and 70 has a height equal to air bearing surface 46. Center pad 66 is located substantially along the longitudinal axis of slider 20. Transducing head 32 is located on center pad 66. A pole tip 72 of transducing head 32 is located on air bearing surface 46 approximately where the longitudinal axis of slider 20 intersects trailing edge 40. First side pad 68 is located approximately at the intersection between trailing edge 40 and first side edge 42. Preferably, first side pad 68 is connected to first side rail 54. Second side pad 70 is located approximately at the intersection of trailing edge 40 and second side edge 44. Preferably, second side pad 70 is connected to second side rail 64.

A center trench 74, at step depth 52, is positioned within center pad 66. Center trench 74 has a back wall 76 formed by center pad 66, and an inlet 78. Inlet 78 lies closer to leading edge 38 than back wall 76, and inlet 78 is substantially parallel to leading edge 38. An outer perimeter 80, at step depth 52, surrounds center pad 66 and intersects with center trench 74 at inlet 78.

A first side trench 82, at step depth 52, extends into first side pad 68. First side trench 82 has a back wall 84 formed by first side pad 68, and an inlet 86. A second side trench 88, at step depth 52, extends into second side pad 70. Second side trench 88 has a back wall 90 formed by second side pad 70, and an inlet 92. Inlets 86 and 92 lie closer to leading edge 38 then back walls 84 and 90. Inlets 86 and 92 are disposed substantially parallel to leading edge 38. Although slider 20 of FIG. 3 is shown having side pads and trenches, additional embodiments of slider 20 may include no side pads or trenches.

Two channels, a first channel 94 and a second channel 96 are positioned on center pad 66 downstream of center trench 74. Channels 94 and 96 are recessed from air bearing surface 46 at a channel depth 98. Channel depth 98 is preferably equal to step depth 52. First channel 94 has a first end 100 and a second end 102, and second channel 96 has a first end 104 and a second end 106. First ends 100 and 104 of channels 94 and 96 intersect back wall 76 of center trench 74. Second ends 102 and 106 of channels 94 and 96 form an outlet where they intersect with outer perimeter 80. First channel 94 extends through center pad 66 relative to the longitudinal axis of slider 20 at a positive angle preferably greater than 90 degrees and less than 180 degrees, and most preferably at a positive angle greater than 130 degrees and less than 170 degrees. In this embodiment of slider 20, first channel 94 extends at a positive angle of about 150 degrees. Second channel 96 extends through center pad 66 relative to the longitudinal axis of slider 20 at a negative angle preferably greater than 90 degrees and less than 180 degrees, and most preferably at a negative angle greater than 130 degrees and less than 170 degrees. In this embodiment of slider 20, second channel 96 extends at a negative angle of about 150 degrees.

A first side channel 108 is positioned on first side pad 68 and a second side channel 110 is positioned on second side pad 70. Side channels 108 and 110 are positioned downstream of side trenches 82 and 88. Side channels 108 and 110 are recessed from air bearing surface 46 at channel depth 98. First side channel 108 has a first end 112 that intersects back wall 84 of first side trench 82. A second end 114 of first side channel 108 forms an outlet where it intersects a rear edge 116 of first side pad 68. Second side channel 110 has a first end 118 that intersects back wall 90 of second side trench 88. A second end 120 of second side channel 110 forms an outlet where it intersects a rear edge 122 of second side pad 70. Rear edges 116 and 122 are preferably positioned substantially parallel to trailing edge 40. Side channels 108 and 110 preferably extend substantially parallel to the longitudinal axis of slider 20.

Figure 4:
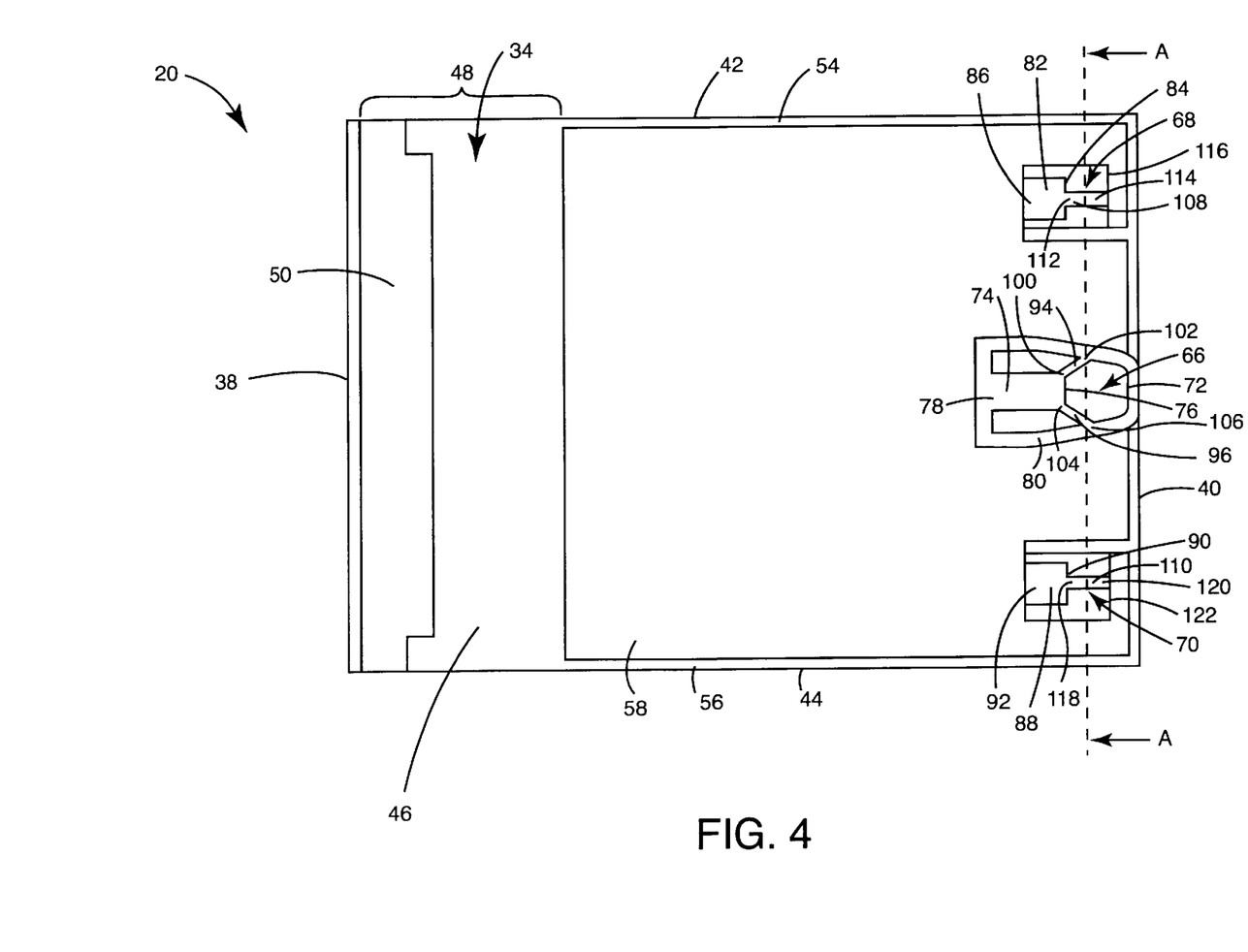
FIG. 4 shows a bottom view of the slider shown in FIG. 3.
Figure 5:
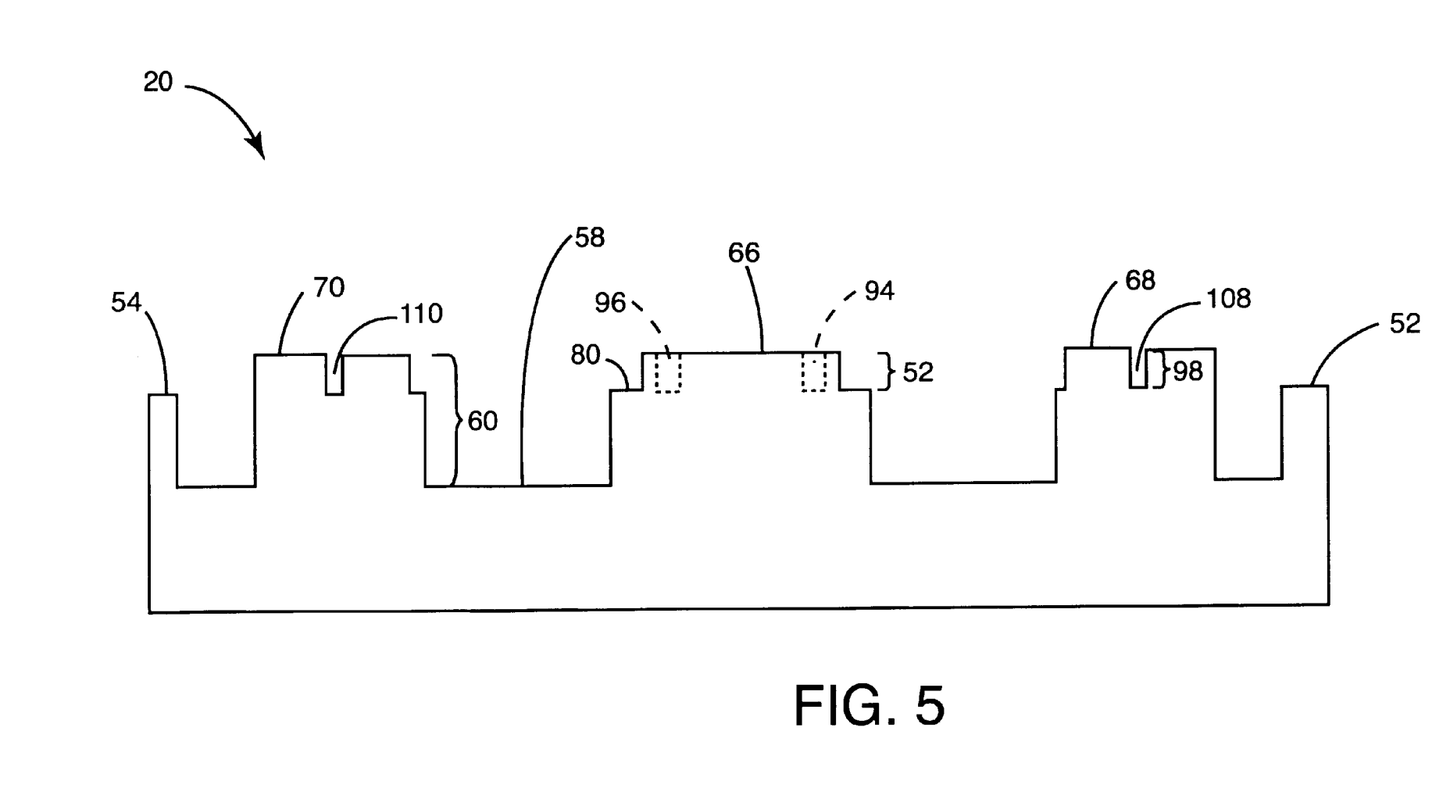
FIG. 5 shows a sectional view of the slider taken along line A—A of FIG. 4.

FIG. 4 shows a bottom view of slider 20 and FIG. 5 is a cross-sectional view of slider 20 taken along line A—A of FIG. 4. FIG. 5 illustrates the contours of disc opposing face 36 of slider 20. Slider 20 has air bearing surface 46 which is the tallest surface of slider 20 and provides a reference level. Pads 66, 68 and 70, as well as cross rail 48, have a height equal to air bearing surface 46. The trenches (74, 82 and 88), front portion 50 of cross rail 48, side rails 54 and 56, and outer perimeter 80 are recessed from air bearing surface 46 at step depth 52. Channels 94, 96, 108 and 110 are recessed from air bearing surface 46 at channel depth 98, which is about equal to step depth 52. Cavity 58 is recessed from air bearing surface 46 at cavity depth 60.

With reference to FIG. 4, in operation slider 20 flies over the surface of disc 24 (FIG. 1) with disc opposing face 36 facing the disc. At startup, the disc rotates about its axis which generates a relative flow of air immediately adjacent to the surface of the disc. This air flows in relation to disc opposing face 36 of slider 20 from leading edge 38 toward trailing edge 40. The air flows over leading edge 38 and cross rail 48 and then redistributes itself within cavity 58. The air traveling over cross rail 48 generates a negative pressure within cavity 58 behind cross rail 48 and forward of pads 66, 68 and 70. The negative pressure, or suction force, pulls slider 20 downward toward the disc. Suspension 16 (FIG. 1) and flexure 18 (FIG. 1) exert a preload force upon slider 20. The preload force pushes slider 20 downward toward the disc.

For slider 20 to fly at an ultra-low height above the surface of the disc during operation, a force must be generated to lift and maintain slider 20 at a fly height above the disc. The air traveling through cavity 58 continues toward trailing edge 40 of slider 20. A portion of the air is directed into and confined within trenches 74, 82 and 88. Confining the air within trenches 74, 82 and 88 generates a lift force and increased pressurization on the pads, thereby pushing slider 20 upward and away from the disc. The function of the trenches is to produce a high pressure gradient induced by the confinement of air within the trenches. The lift force balances the negative pressure and preload force and enables slider 20 to maintain an ultra-low flying height above disc 24.

Increased information storage density requires reduced fly height and decreased HMS between transducing head 32 and disc 24 (FIG. 1). As a result of the decreased HMS, during operation of the disc drive actuation system, lubricant accumulates on disc opposing face 36 of slider 20, and in particular within trenches 74, 82 and 88. In prior art sliders, lubricant accumulation results in fly attitude problems, or flyability problems, for slider 20, including slider crashes. Lubricant is applied to the disc to prevent corrosion and to protect slider 20 and transducing head 32 from damage during intermittent contact between slider 20 and the disc. Lubricant is displaced from the disc by evaporation or head disc contact may collect on disc opposing face 36 of slider 20. The lubricant migrates across disc opposing face 36 and accumulates on slider 20 where the air flow tends to produce a stagnation point. The trenches 74, 82 and 88 act to generate a lift force by confining the air. Air confinement is associated with air flow stagnation. The trenches are therefore a preferred location for lubricant accumulation because they are associated with air flow stagnation.

Accumulation of lubricant within trenches 74, 82 and 88 changes the contours of disc opposing face 36, thereby inducing a loss of fly height. A loss of fly height leaves slider 20 more susceptible to media-topography induced fly height modulation which leads to intermittent contact between slider 20 and the disc. Contact between slider 20 and the disc induces further lubricant pickup from the disc. Contact induced lubricant pickup in combination with condensation induced lubricant pickup results in further loss of fly height for slider 20. Cumulative fly height loss eventually results in slider 20 crashing into the disc.

While slider 20 is flying over the surface of the disc, various factors, such as mechanical shock and variations in the air flow, may cause slider 20 to contact the disc or to not maintain a steady flying height. Additionally, variation in the surface topography of disc 24 has a significant effect on modulation of the HMS. The surface topography of the disc is not perfectly flat and may be characterized by some typical roughness. As fly height is reduced, even small variations in media topography may disturb the air bearing and cause the HMS to vary in time. Maintaining HMS within acceptable limits is required for acceptable reading and writing onto the media. Increased recording density (increased density of concentric data tracks 26 on the disc) is enabled by reducing HMS. Reduced HMS requires reduced HMS modulation to ensure adequate flyability of the head over the media. Modulation of the HMS leads to intermittent contact between slider 20 and the disc and induces further lubricant pickup from the disc.

The present invention slider 20 includes channels for flushing lubricant accumulated on the slider. Channels 94 and 96 are positioned within center pad 66 and side channels 108 and 110 are positioned within side pads 68 and 70 respectively. Channels 94, 96, 108 and 110 are positioned downstream of their respective trenches 74, 82 and 88. Channels 94, 96, 108 and 110 began at the back wall of their respective trenches 74, 82 and 88 and extend through the pads to communicate with an area recessed from air bearing surface 46. Channels 94, 96, 108 and 110 flush the lubricant accumulated within trenches 74, 82 and 88. As air flows over disc opposing face 36 from leading edge 38 to trailing edge 40, the air flow flushes accumulated lubricant from the trenches. The lubricant is propelled through channels 94, 96, 108 and 110 toward trailing edge 40 and expelled from pads 66, 68 and 70 through there respective outlets. The pressure within the channel is higher than at its outlet, thereby inducing flushing of fluid from the trench. Preferably, the channels follow the air flow streamline so that the airflow flushes lubricant accumulated in the trench through the channels.

Lubricant accumulation in the trenches leads to degradation in flyability performance and slider crashing. The present invention channels 94, 96, 108 and 110 prevent lubricant accumulation within trenches 74, 82 and 88. Thereby, fly height is not lost and flyability of slider 20 is preserved such that condensation traveling across disc opposing face 36 is less detrimental.

A portion of the air traveling over disc opposing face 36 of slider 20 is directed into the trenches and confined within the trenches to generate a lift force and increased pressurization on the pads. Channels 94, 96, 108 and 110 do not degrade the pressurization and lift force of the trenches. Trench performance and flushing properties can be achieved by optimizing the dimensions, and in particular the length and width, of the channels. That is, the trench induced high pressure gradient is conserved with proper channel dimensions. If the channels are too large, air flows right through and degrades the pressurization within the trenches such that the slider does not fly above the disc as it should. Channels 94, 96, 108 and 110 are narrow and do not interfere with the functioning of trenches 74, 82 and 88. Generally, long and narrow channels maintain the pressurization within their respective trenches better than short and broad channels.

Accumulation of lubricant on the disc opposing face of the slider results in flyability problems for the slider. The effects include loss of fly height for the slider until eventually the slider crashes into the disc. The present invention slider prevents accumulation of lubricant on the slider, and in particular within the trenches of the slider. The present invention slider includes one or more channels positioned downstream of the trench for flushing lubricant from the trench. The channels are in communication with the trench and an area recessed from the air bearing surface of the slider adjacent the trailing edge. Lubricant accumulated in the trenches is propelled through the channels and expelled from the slider. Preventing lubricant accumulation on the disc opposing face of the slider preserves the flyability of the slider.

Although the present invention has been described with reference to preferred embodiments, workers skilled in the art will recognize that changes may be made in form and detail without departing from the spirit and scope of the invention. For example, fewer or more channels may be positioned on each pad.

What is claimed is:

1. A slider comprising:
   a slider body which includes an air bearing surface bounded by a leading edge and a trailing edge, the air bearing surface having a pad proximate the trailing edge, and a trench positioned adjacent to the pad with the trench being recessed from the air bearing surface at a step depth; and means for flushing lubricant accumulated in the trench from the slider body.

2. The slider of claim 1 wherein the means for flushing lubricant is a channel positioned on the pad, the channel being recessed from the air bearing surface.

3. A slider comprising:
   a slider body having an air bearing surface bounded by a leading edge, a trailing edge, and first and second side edges, the slider body having a longitudinal axis;
   a pad proximate the trailing edge on the air bearing surface;
   a trench positioned adjacent to the pad, the trench being recessed from the air bearing surface at a step depth; and
   a channel for flushing lubricant from the air bearing surface, the channel positioned on the pad and having a first end and a second end, the first end connected to the trench and the second end lying adjacent an outer edge of the pad proximate the trailing edge, wherein the channel is recessed from the air bearing surface at a channel depth.

4. The slider of claim 3 wherein the channel depth is about 0.1 microns to about 0.3 microns.

5. The slider of claim 3 wherein the pad is a center pad located along the longitudinal axis of the slider body.

6. The slider of claim 5 wherein the channel comprises a first channel section and a second channel section positioned on the center pad, the first channel section extending relative to the longitudinal axis at a positive angle greater than 90 degrees and less than 180 degrees and the second channel section extending relative to the longitudinal axis at a negative angle greater than 90 degrees and less than 180 degrees.

7. The slider of claim 6, and further comprising:
   first and second side rails positioned substantially along the first and second side edges.

8. The slider of claim 7, and further comprising a left side pad and a right side pad located at ends of the first and second side rails adjacent the trailing edge, and a lift trench is positioned adjacent to the left side pad and a right trench is positioned adjacent to the right side pad wherein the left trench and the right trench are recessed from the air bearing surface at the step depth.

9. The slider of claim 8, and further comprising:
   a left side channel positioned on the left side pad and extending from the left trench longitudinally along the left side pad substantially parallel to the longitudinal axis; and
   a right side channel positioned on the right side pad and extending from the right trench longitudinally along the right side pad substantially parallel to the longitudinal axis.

10. The slider of claim 3, and further comprising:
    a cross rail positioned along the leading edge and extending from the first side edge to the second side edge wherein the cross rail has a height equal to the air bearing surface.

11. The slider of claim 3 wherein the channel flushes lubricant accumulated in the trench from the air bearing surface.

12. The slider of claim 3 wherein the channel is positioned downstream of the trench.

13. A slider comprising:
    a slider body having an air bearing surface bounded by a leading edge, a trailing edge, and first and second side edges, the slider body having a longitudinal axis;
    a pad proximate the trailing edge on the air bearing surface;
    a cross rail positioned along the leading edge and extending from the first side edge to the second side edge wherein the cross rail has a height equal to the air bearing surface;
    first and second side rails positioned substantially along the first and second side edges;

a cavity positioned on the air bearing surface, wherein the cavity is at a cavity depth recessed from the air bearing surface, at least a portion of the cavity preceding the pad;

a trench positioned adjacent to the pad, the trench being recessed from the air hearing surface at a step depth; and a channel for flushing lubricant from the air bearing surface, the channel positioned on the pad and having a first end and a second end, the first end connected to the trench and the second end lying adjacent an outer edge of the pad proximate the trailing edge, wherein the channel is recessed from the air bearing surface at a channel depth.

14. The slider of claim 13 wherein the channel is positioned downstream of the trench.

15. The slider of claim 13 wherein the pad includes a center pad located along the longitudinal axis of the slider body.

16. The slider of claim 15 wherein the channel comprises a first channel section and a second channel section positioned on the center pad, the first channel section extending relative to the longitudinal axis at a positive angle greater than 90 degrees and less than 180 degrees and the second channel section extending relative to the longitudinal axis at a negative angle greater than 90 degrees and less than 180 degrees.

17. The slider of claim 13 wherein the pad is a center pad, and the slider further comprises:

a left side pad and a right side pad located at ends of the first and second side rails adjacent the trailing edge; and a left trench positioned adjacent to the left side pad and a right trench positioned adjacent to the right side pad wherein the left trench and the right trench are recessed from the air hearing surface at the step depth.

18. The slider of claim 17, and further comprising:

a left side channel positioned on the left side pad and extending from the left trench longitudinally along the left side pad substantially parallel to the longitudinal axis; and a right side channel positioned on the right side pad and extending from the right trench longitudinally along the right side pad substantially parallel to the longitudinal axis.

* * * * *

UNITED STATES PATENT AND TRADEMARK OFFICE
CERTIFICATE OF CORRECTION

PATENT NO. : 6,747,847 B2
DATED : June 8, 2004
INVENTOR(S) : Timothy W. Stoebe et al.

It is certified that error appears in the above-identified patent and that said Letters Patent is hereby corrected as shown below:

Column 8,
Line 31, delete "lift trench", insert -- left trench --

Signed and Sealed this

Seventh Day of June, 2005

JON W. DUDAS
*Director of the United States Patent and Trademark Office*